United States Patent [19]
Thompson

[11] Patent Number: 5,964,212
[45] Date of Patent: Oct. 12, 1999

[54] KETTLE ROTISSERIE

[76] Inventor: Edward P. Thompson, 55 Salter St., Portsmouth, N.H. 09801

[21] Appl. No.: 09/276,369

[22] Filed: Mar. 25, 1999

[51] Int. Cl.[6] ................. A47J 37/00; F24B 3/00
[52] U.S. Cl. ................. 126/25 R; 126/41 B; 126/338; 99/443 R
[58] Field of Search ................. 126/25 R, 41 R, 126/41 A, 41 B, 338, 339, 337 R; 99/450, 443 R; 219/754, 752, 755

[56] References Cited

U.S. PATENT DOCUMENTS

| | | | |
|---|---|---|---|
| 1,380,078 | 5/1921 | Partonnar | 126/338 |
| 2,819,667 | 1/1958 | Victor | 126/25 R |
| 3,131,685 | 5/1964 | Bergfield | 126/338 |
| 3,134,320 | 5/1964 | Meyer | 126/338 |
| 4,210,794 | 7/1980 | Oguri | 126/41 A |
| 4,663,517 | 5/1987 | Huff et al. . | |
| 4,777,927 | 10/1988 | Stephen et al. . | |
| 5,787,873 | 8/1998 | Whitehouse | 126/41 A |

*Primary Examiner*—James C. Yeung
*Attorney, Agent, or Firm*—Phillip E. Decker

[57] ABSTRACT

A barbecue rotisserie apparatus comprising a conventional barbecue apparatus and a novel rotisserie apparatus. The rotisserie apparatus comprises a ring having a substantially U-shaped cross section, rollers that are rotatably secured within their axis of rotation within the ring U cross section, and a drive apparatus secured to the barbecue for rolling the ring around the bowl of the barbecue apparatus. A bracket means on the ring supports the grill. The drive apparatus comprises a motor, friction wheel, and rigid enclosure.

20 Claims, 3 Drawing Sheets

KETTLE ROTISSERIE

BACKGROUND

1. Field of the Invention.

The present invention relates generally to outdoor cooking apparatuses, and more particularly to barbecues.

2. Description of the Related Art.

There are a number different types of barbecues in use today, and they generally have the same essential features. They have a bowl for holding fuel, such as charcoal, wood, or a gas burner. They also have a cooking grate surface, such as a grill, that is set in or on the bowl over the fuel. Often they will have a lid that has a groove that fits on the lip of the bowl to substantially enclose the cooking volume. One such barbecue is disclosed in U.S. Pat. No. 4,777,927, by Stephen et al., which is not admitted to be prior art by its inclusion in this background section. That patent discloses a barbecue kettle, wherein the bowl and the lid are substantially hemispherical.

In use, a cook seeks to prepare several food items at the same time by placing similarly-sized items on the barbecue grill for cooking. Ideally, the food items are finished cooking at the same time if they have been prepared to be the same size. However, it is well-known that this is rarely the case. The lid must be removed repeatedly and the food items moved around the grill to even out the cooking times. Every time the lid is removed, heat escapes, and cooking times increase. This can make barbecue cooking inefficient. Eating overcooked food can be very undesirable. Eating undercooked food can be very unhealthy.

There may be several problems in the standard barbecue to explain why cooking times are different. Coals, or other heating items, may be distributed unevenly under the cooking grate. There may also be restricted or blocked air flow within the barbecue. These problems in combination with the cook constantly removing the grill's top to turn items tends to make cooking times very uneven. These problems demand a solution.

In some barbecues, like that disclosed in Stephen et al., a lid is used to help even out cooking by convective heating. Although convective heating may be more uniform in these types of barbecues, they do not address the problem of uneven radiative heating from the fuel source below. The amount of radiative heating directly from the coals may far exceed the amount of convective heating available, especially if the cook must repeatedly remove the lid to move the food items around.

In other barbecues, a rotisserie apparatus is used to slowly rotate the food items over, or along side, the heat source. Such a barbecue is disclosed in U.S. Pat. No. 4,663,517, by Huff et al., which is not admitted to be prior art by its inclusion in this background section. These barbecues employ a motorized or hand-operated apparatus that holds the food item and rotates vertically along the horizontal rotisserie axis. This type of barbecue is adequate to uniformly cook large food that hold together well, items like whole chicken and turkey. However, they are unsuitable to cook food items that must lie on a horizontal grill so that they do not fall apart. Examples of such food items are hamburgers, shish kabobs, stuffed peppers, pizzas, steak, fish, chicken parts, hot dogs, sausages, and grilled vegetables, like onions and corn. The rotisserie also cannot brown items like hamburger and hot dog rolls.

What is needed, therefore, is a barbecue apparatus that is capable of heating food evenly on a horizontal grill, even though the fuel underneath is not burning evenly.

SUMMARY

The present invention is directed to an apparatus that satisfies this need. An apparatus having the attributes of the present invention is a barbecue rotisserie apparatus comprising a barbecue and grill, a ring having a U-shaped cross section that fits over the lip of the bowl when inverted and rollers secured inside the ring for rolling the ring on the lip of the bowl, a bracket located on the ring for supporting the grill, and drive apparatus secured to the outside of the bowl such that the drive apparatus contacts the ring and rolls the ring and grill around the lip of the barbecue, thereby cooking food items evenly over fuel that may not be burning evenly. The present invention can be supplied as a kit for modifying existing barbecues, or it can be provided with a new barbecue. These and other features and embodiments of the invention will be made clear in the following drawings and description.

DRAWINGS

DESCRIPTION

Figure 1:
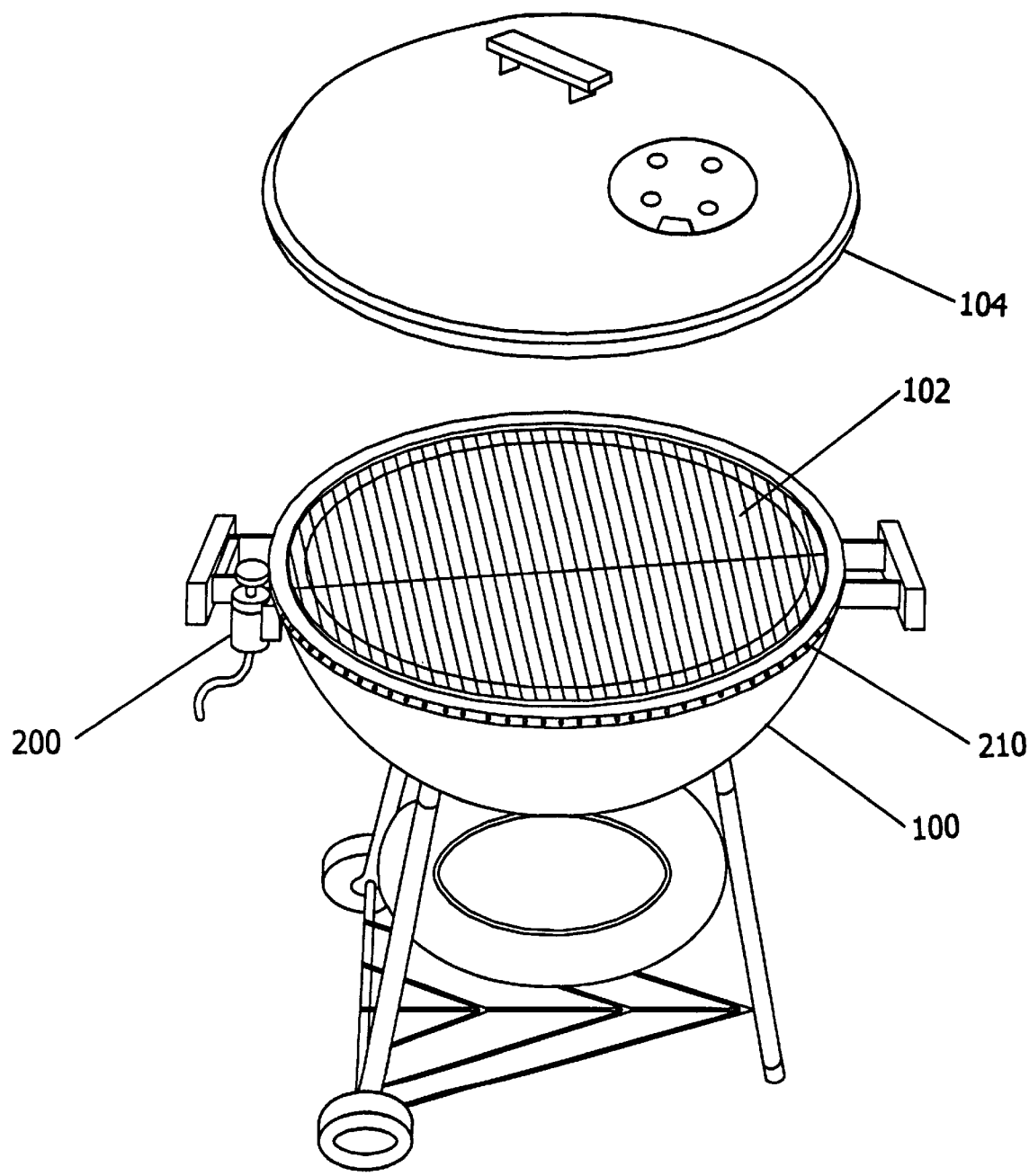
FIG. 1 is a perspective view of a kettle-style barbecue with a rotisserie apparatus.

FIG. 1 shows a typical barbecue apparatus, which in this case is of the kettle type. The present invention works with many types of barbecues, including cylindrical barbecues, so long as it has a lip that is substantially circular. A barbecue bowl 100 is provided, into which fuel such as charcoal is placed and ignited. In this specification, it is understood that the term bowl refers to the semi-enclosed spaced under a grill 102 where barbecue fuel is placed, whether the bowl is hemispherical, cylindrical, or otherwise. An optional lid 104 can be provided, which is sized to fit the lip of the bowl.

In the present invention, a rotisserie apparatus is provided comprising a ring 210, which is placed over the lip of the bowl 100. The grill 102 is then set inside the ring 210. A rotisserie drive apparatus 200 is secured to the outside of the bowl 100 and is located in such a way to enable it to enable it to roll the ring 210 around the lip of the bowl 100.

Figure 2:
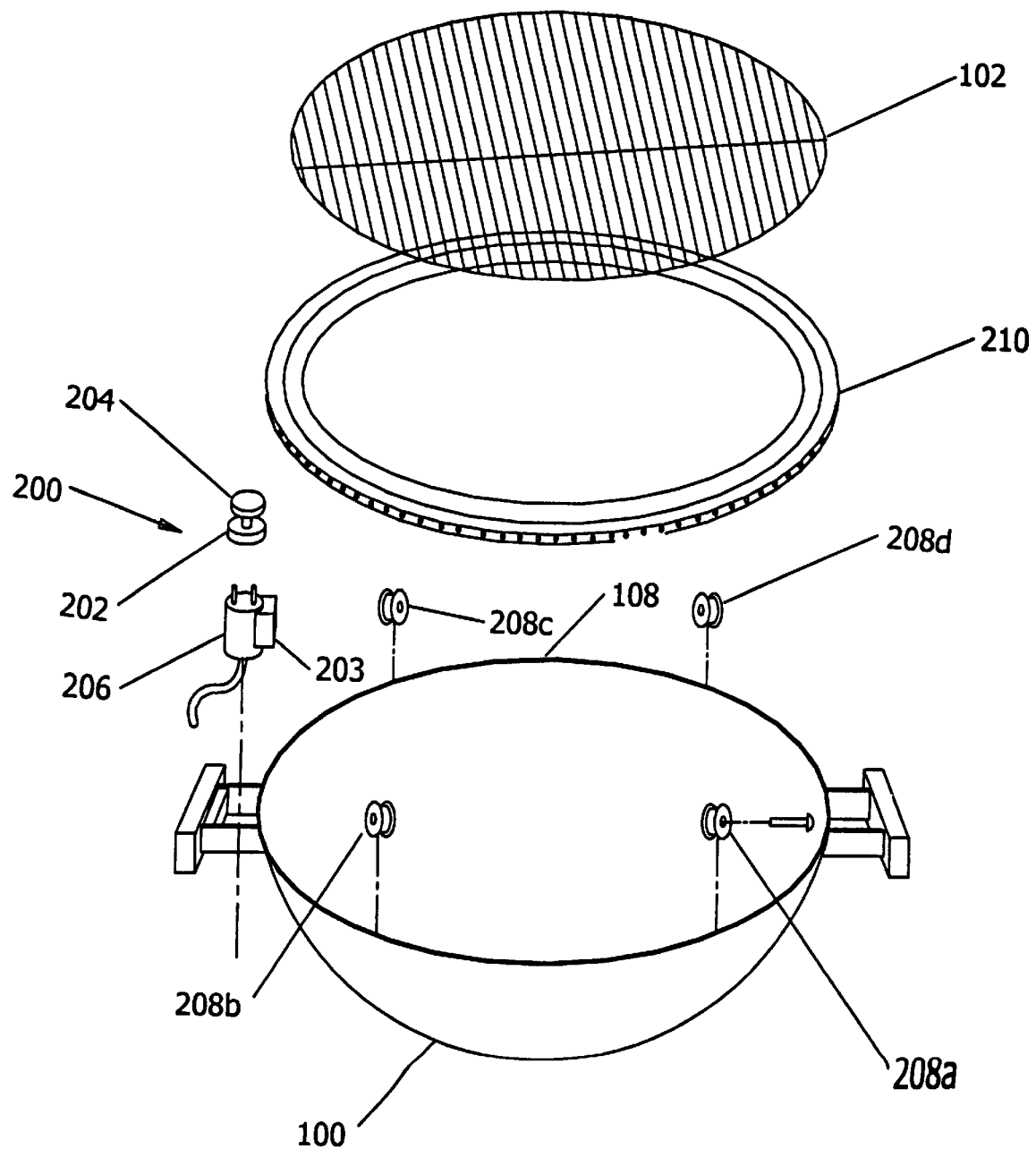
FIG. 2 is an exploded view of the rotisserie apparatus with the barbecue components.

FIG. 2 is an exploded view which shows more of the details of the rotisserie apparatus. The view shows that there are four rollers 208a, 208b, 208c, and 208d, placed between the ring 210 and the lip 108 of the bowl 100. Although the preferred embodiment uses four, generally any number greater than three can be used.

Details of the drive apparatus 200 are shown. An electric motor 202 is in communication with a friction wheel 204 by a drive shaft, transmission, or other means. A variable speed controller 203 can be provided to vary the power output of the motor 202, thus turning the rotisserie apparatus at different speeds. The drive apparatus 200 is enclosed in a rigid housing 206. The housing is preferably a weather-proof electrical enclosure. The drive apparatus 200 can also be provided with a clutch means for disengaging the motor 202 from the friction wheel 204. This is preferable when the motor is not in operation, or when the cook needs to override the rolling motion of the rotisserie.

Figure 3:
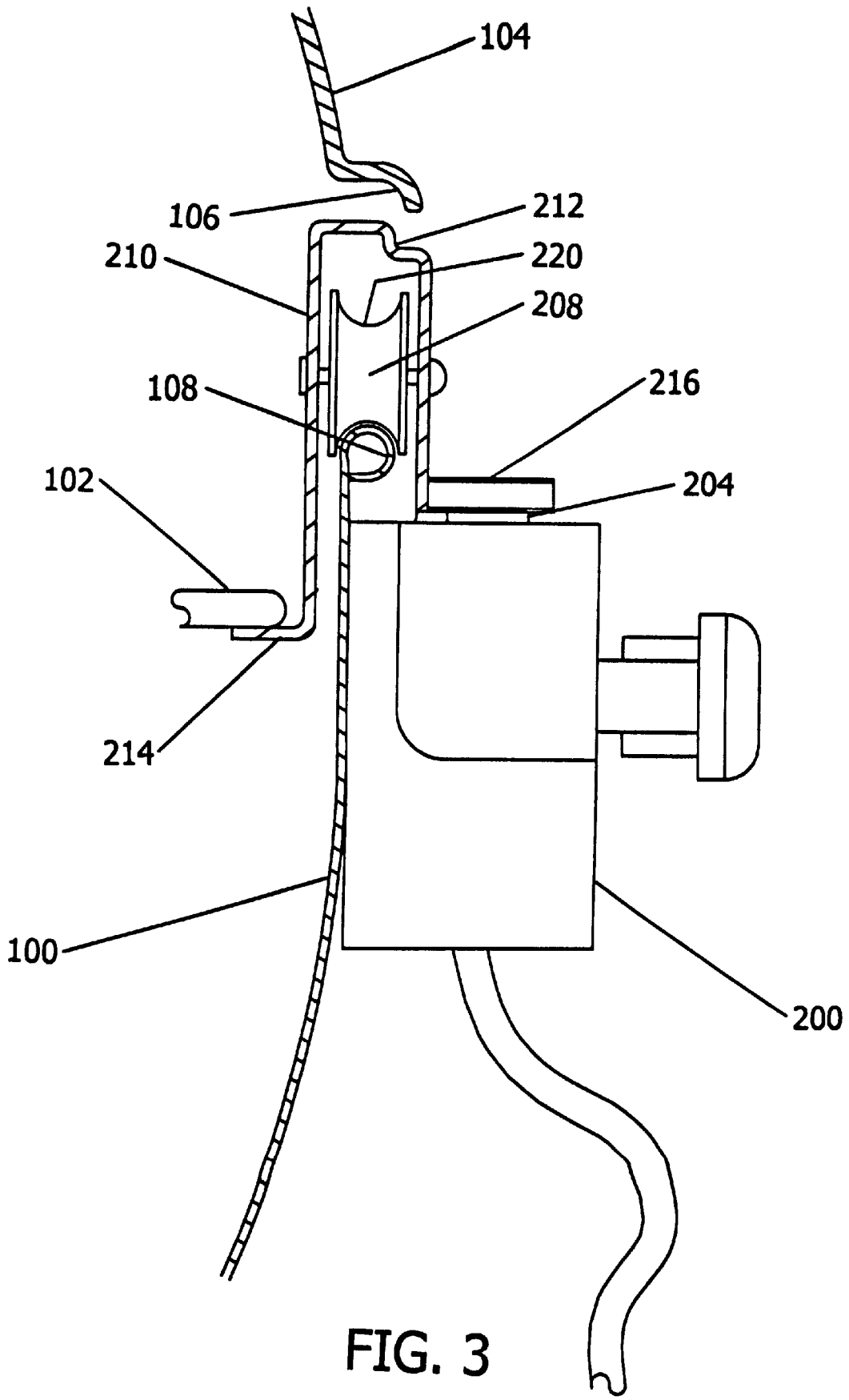
FIG. 3 is a cross sectional view of of the rotisserie apparatus with the barbecue components.

FIG. 3 is a cross section showing the details of the present invention. The ring 210 has a substantially U-shaped cross section, which is sized to fit over the lip 108 of the bowl 100 when the ring is inverted. The rollers 208 are rotatably secured through their axis of rotation substantially equidistantly within the U-section of the ring 210, which enables the ring to roll around the lip 108 of the bowl 100. As shown, the rollers 208 are pulley-shaped, and have a grooved rim 220 adapted to receive the lip 108. Other rim shapes can be provided, including flat rims.

In addition to the U-section, the ring 210 also has a bracket means portion 214 located at the end of the U-section nearest the center of the ring, i.e., the inside end. The purpose of the bracket means is to support the grill 102 and food items, and is sized for that purpose. The bracket means 214 can be an integral continuous ridge or tabs made part of the ring 210, or can be brackets or tabs added to the ring.

Optionally, a friction wheel contact surface shelf 216 can be provided. The shelf 216 helps the friction wheel 204 frictionally contact the ring 210 for rolling the ring around the bowl 100. The contact surface shelf 216 is located at an end of the U-section farthest from the center of the ring 210, i.e. the outside end.

Since many barbecue apparatuses come with a lid 104, a boss 212 can be provided at the outside of the curved portion of the U-section, which is substantially the same size and shape as the lip 108 of the bowl 100. The boss 212 fits into the groove 106 of the lid 104 to help keep the lid in place when in use.

In practice, rotisserie apparatuses which are the subject of the present invention can be provided as retrofit kits for existing barbecues, or they can be provided with new barbecues. The ring 210 can be stamped or extruded out of sheet metal, and painted to match or compliment the barbecue. Tools, such as a wrench and/or a screwdriver, can be provided with a kit to help the cook assemble the rotisserie apparatus onto the barbecue.

In operation, a cook ignites the fuel and spreads it around the bowl 100 as is the normal practice. The rotisserie apparatus is energized, and starts turning the grill 102 around the bowl. The cook places a number of food items on the grill for cooking. Each food item passes over the hot areas and the cool areas of the fuel. Therefore, each food item will obtain substantially the same amount of heat, and will therefore be cooked evenly and be finished at the same time. The cook no longer needs to turn each food item to see if it is cooked, wasting time and heat. A check of one item indicates the condition of all of the food items of the same type and size.

The present invention is also suitable for easily moving food items off the heat. Many barbecue connoisseurs intentionally create a hot zone to one side of the bowl, which leaves the other side cooler. In this way, the cook can move foods off heat by rotating the grill manually or by using the motor. Also, by mechanically rotating the items to be cooked on the horizontal plane using the motor or manual movement, a cook can sear the juices into the meat on each pass over the hot area. In the prior art, this is done by a cook frantically manually moving items around the grill by hand, with flames and intense smoke imperiling his safety.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

I claim:

1. A barbecue rotisserie apparatus comprising
    a barbecue apparatus, said barbecue apparatus comprising a bowl having a substantially circular lip, and a substantially circular grill suitably adapted to fit within said bowl; and
    a rotisserie apparatus, said rotisserie apparatus comprising a ring, at least three rollers, and a drive apparatus; wherein
        said ring has a substantially U-shaped cross section sized to fit over the lip when the ring is inverted, said ring also having a bracket means portion located at the end of the U section nearest the center of the ring and that is suitably adapted to support the grill;
        said rollers are rotatably secured through their axis of rotation substantially equidistantly to the ring within the U section such that the ring can roll around the lip of the barbecue; and
        said drive apparatus is secured to the outside of the bowl such that the drive apparatus can contact the ring and roll the ring around the lip of the barbecue.

2. The barbecue rotisserie apparatus of claim 1, said ring further comprising a contact surface shelf located at an end of the U section farthest from the center of the ring and that is suitably adapted to frictionally contact the drive apparatus for rolling the ring around the lip of the barbecue.

3. The barbecue rotisserie apparatus of claim 1 comprising four rollers.

4. The barbecue rotisserie apparatus of claim 1, wherein said rollers have a grooved rim that is suitably adapted to receive the lip of the bowl.

5. The barbecue rotisserie apparatus of claim 1, said drive apparatus comprising an electric motor and a friction wheel in communication with said motor such that the drive wheel frictionally contacts the ring and rolls the ring around the lip of the barbecue.

6. The barbecue rotisserie apparatus of claim 5, said drive apparatus further comprising a clutch means for disengaging the motor from the friction wheel so that the ring can be rolled around the lip of the barbecue by the operator without the motor.

7. The barbecue rotisserie apparatus of claim 5, said drive apparatus further comprising a variable speed control for the motor.

8. The barbecue rotisserie apparatus of claim 5, wherein said drive apparatus is substantially enclosed in a rigid housing.

9. The barbecue rotisserie apparatus of claim 8, wherein the housing is a weather-proof electrical enclosure.

10. The barbecue rotisserie apparatus of claim 1, said barbecue apparatus further comprising a lid having a substantially circular groove suitably adapted for receiving the lip of the bowl.

11. The barbecue rotisserie apparatus of claim 10, said ring further comprising a boss located at the outside of the curved portion of the U section and substantially the same size and shape as the lip of the bowl and suitably adapted for taking the groove of the lid.

12. A barbecue rotisserie kit which when assembled will rotate a barbecue grill comprising
    a ring having a substantially U-shaped cross section sized to fit over a lip of a barbecue bowl when the ring is inverted, said ring also having a bracket means portion located at the end of the U section nearest the center of the ring and that is suitably adapted to support the grill;
    at least three rollers which can be rotatably secured through their axis of rotation substantially equidistantly to the ring within the U section such that the ring can roll around the lip of the barbecue; and a drive apparatus, which can be secured to the outside of the bowl such that the drive apparatus can contact the ring and roll the ring around the lip of the barbecue.

13. The barbecue rotisserie kit of claim 12, said ring further comprising a contact surface shelf located at an end of the U section farthest from the center of the ring and that is suitably adapted to frictionally contact the drive apparatus for rolling the ring around the lip of the barbecue.

14. The barbecue rotisserie kit of claim 12 comprising four rollers.

15. The barbecue rotisserie kit of claim 12, wherein said rollers have a grooved rim that is suitably adapted to receive the lip of the bowl.

16. The barbecue rotisserie kit of claim 12, said drive apparatus comprising an electric motor and a friction wheel in communication with said motor such that the drive wheel frictionally contacts the ring and rolls the ring around the lip of the barbecue.

17. The barbecue rotisserie kit of claim 16, said drive apparatus further comprising a clutch means for disengaging the motor from the friction wheel so that the ring can be rolled around the lip of the barbecue by the operator without the motor.

18. The barbecue rotisserie kit of claim 16, said drive apparatus further comprising a variable speed control for the motor.

19. The barbecue rotisserie kit of claim 16, wherein said drive apparatus is substantially enclosed in a rigid housing.

20. The barbecue rotisserie kit of claim 19, wherein the housing is a weather-proof electrical enclosure.

* * * * *